United States Patent [19]

Dreyfuss et al.

[11] Patent Number: 4,662,402
[45] Date of Patent: May 5, 1987

[54] SYSTEM FOR PROTECTING MACHINE THREADS

[76] Inventors: Wilfried Dreyfuss, Dorfstrasse 52, D-3111 Eimke, Fed. Rep. of Germany; Thomas E. Remp, Jr., 5555 Del Monte Dr., Houston, Tex. 77056; Kurt Muller, Muhlenweg 58, 3101 Eicklingen, Fed. Rep. of Germany

[21] Appl. No.: 894,705

[22] Filed: Aug. 7, 1986

Related U.S. Application Data

[60] Continuation of Ser. No. 600,392, Apr. 16, 1984, abandoned, which is a division of Ser. No. 364,474, Mar. 31, 1982, Pat. No. 4,492,666.

[30] Foreign Application Priority Data

Sep. 24, 1979 [DE] Fed. Rep. of Germany ....... 2938512
Sep. 28, 1979 [DE] Fed. Rep. of Germany ....... 2939383
Sep. 28, 1979 [DE] Fed. Rep. of Germany ....... 2939384

[51] Int. Cl.⁴ ...................... B65D 59/00; F16L 57/00
[52] U.S. Cl. ..................................... 138/96 T; 138/89; 220/307; 220/DIG. 19
[58] Field of Search ................ 138/89, 96 T; 220/307, 220/DIG. 19

[56] References Cited

U.S. PATENT DOCUMENTS

| | | | |
|---|---|---|---|
| 2,095,528 | 10/1937 | Osborn et al. | 138/96 T |
| 2,098,087 | 11/1937 | Engstrom | 138/96 T |
| 2,316,013 | 4/1943 | Mulholland | 138/96 T |
| 2,362,675 | 11/1944 | Stebbins | 138/89 |
| 2,670,871 | 3/1954 | Spiess, Jr. et al. | 220/307 |
| 2,709,456 | 5/1955 | Hillix | 138/96 T |
| 2,977,993 | 4/1961 | Scherer | 138/96 |
| 3,168,961 | 2/1965 | Yates | 220/307 |
| 3,563,277 | 2/1971 | Klipper | 138/96 R |
| 3,621,623 | 11/1971 | Downes | 138/96 R |
| 4,379,471 | 4/1983 | Kuenzel | 138/96 T |

FOREIGN PATENT DOCUMENTS 2294931 12/1974 France .
2391120 5/1977 France .

OTHER PUBLICATIONS

Article entitled "Grundlagen der Kunststoffverarbeitung", by W. Knappe, published by Carl Hanser Verlag Munchen (1970), pp. 171–174.

Primary Examiner—John W. Shepperd
Attorney, Agent, or Firm—Allegretti, Newitt, Witcoff & McAndrews, Ltd.

[57] ABSTRACT

System for protecting machine parts, such as threads, from physical and chemical damage. The parts to be protected are cleaned, coated with a separating agent, and a mold is placed around them. A protective material is inserted in the interspace between the mold and pipe end. The protective material forms a tough, protective jacket. If desired, the mold can later be removed by means of a tear-open element or integrated weak spots. For the protection of pipe interiors, plastic material can be pressed into the end of the pipe such that it seals against the inside lining of the pipe.

1 Claim, 2 Drawing Figures

SYSTEM FOR PROTECTING MACHINE THREADS

This application is a continuation of Ser. No. 600,392 filed Apr. 16, 1984, now abandoned, which is a divisional of application Ser. No. 364,474 filed Mar. 31, 1982 now U.S. Pat. No. 4,492,666.

BACKGROUND OF THE INVENTION

The present invention relates generally to a system for protecting threads. More particularly, the invention relates to a system for protecting machine threads as well as methods for producing and attaching such protective devices to machine threads.

Threads are found, for example, on machine parts and pipes. Threads typically represent delicate areas that must be protected against harmful mechanical and chemical effects during their transportation and storage.

Consequently, it often becomes necessary to protect machine parts and pipes from damage by using protective caps and the like. When pipes are transported, for example, they are often subjected to very rough treatment. If pipes are to be used in a drilling operation, they are often first pulled up a drilling tower and, as a result, suffer damage. The actual threads, as well as the sealing flanges on the ends of the threads, are often damaged. Even a slightly damaged thread can render an expensive pipe unusable.

In addition to mechanical damage to pipes, the effect of the environment also can render pipes unusable. Salt water, sand, dust, as well as snow, rain, and wind have adverse effects on pipes. Corroded or rusted threads and sealing flanges render pipes unusable; repair of such chemically damaged pipes is expensive. Thus, it is imperative that threads and sealing flanges remain in good condition if the threads are to maintain good connections.

In conventional practice, threads have been protected by screwing protective caps onto them. Such caps may be either open sleeves or closed plugs. Protective caps may be screwed onto the pipes having threads on their outer surface (pivots). Similarly, protective caps may be used which have threads on their exterior surface which are screwed onto the inside threads (bushings) of a pipe.

Protection against chemical influences may be achieved by coating the threads with grease. In addition, there are now protective caps made of synthetic material; such caps often provide sufficient protection for threads.

There are many cases, however, where very high demands are made on the mechanical strength of a protective cap. For example, it is common to pull pipes, which are to be used in an oil drilling operation, into a drilling tower. During such an operation, the lower end of the pipe experiences considerable mechanical stress as a result of the fact that the end of the pipe is dragged on the ground.

Oil drilling operations require that once the pipe is moved into position, the device for protecting the threads must be removed in a very short time. For the steel protective caps now often used, removal is performed by unscrewing the cap. However, this process is time consuming.

In order to reduce the time that is necessary to remove such a steel protective cap, it is frequently loosened before the pipe is pulled onto the drilling tower. Such loosening, however, often causes the protective cap to become cross-threaded such that the thread is damaged by further forced loosening.

Other types of caps are available which are used especially for transporting a pipe onto a drilling tower. Such caps, however, have the disadvantage that they do not sufficiently protect the threads from dirt. Also, such caps often wear out quickly. Moreover, the installation of such a special cap requires time and consequently increases the labor costs of the drilling operation.

Use of steel caps is often undesirable, since they do not protect threads against stronger impacts. Rather, such impacts destroy both the cap and pipe. Furthermore, steel caps often become cross-threaded, and turning the cap then leads to the destruction of the thread. Moreover, steel caps cannot protect threads against the effects of water, moisture, sand, and dust. When pipes are stored for extended periods in the open, the threads thus are exposed to corrosion.

To avoid these disadvantages, pipe users occasionally use protective caps made of metal which are lined with an elastomeric material. The elastomeric material thus provides a better seal between the steel cap and the thread, as well as providing a cushion between the cap and the thread. This helps to protect against the effects of moisture as well as mechanical impact.

It is clear, however, that manufacturing protective caps with an inside lining of elastomeric material requires increased technical expertise as well as added expense. Moreover, such lined caps are ineffective to fully protect threads against moisture, water, and dust.

A type of protective cap currently available is made of synthetic material. Such synthetic caps may be produced with threads; after such caps have been placed on the threads of pipes, they may only be removed by the time-consuming process of unscrewing them. Some synthetic caps do not have threads; this type of construction is also undesirable, since such caps do not fit tightly on the pipes. Thus, the caps are subject to being pulled off inadvertently and do not provide good protection against the penetration of water and dirt.

In order to protect the outer and inner threads of pipes, protective caps, consisting of steel, plastic, or a combination of the materials, are often used. Even if such protective caps are screwed onto the threads and do provide some protection for the threads against damage, such devices provide no protection for the inside of a pipe. As a result, foreign substances, such as water, dirt, ice, and sand, become lodged in the interior of the pipe.

Pipes are often inserted into wells having depths as great as several thousand meters. Thus, a large number of pipes must be screwed together. The threads of the upper pipes must absorb the weight of the entire pipe line. Moreover, the screw connections between the pipes must often be gas-tight. Therefore, complicated thread designs are frequently used. It is clear that such threads must remain intact after their manufacture.

Pipes are also often connected by welding them together. The ends of such pipes are often provided with precise welding chamfers which, like the pipe threads, must be protected.

Pipe used in drilling operations frequently are transported or stored for extended periods. During such times, the pipes are exposed to weather and dirt. If left without protection, the pipe ends are in contact with foreign substances and often corrode, causing a lessening of the integrity of the pipe ends. When such pipes are then to be used, it is a time consuming and expensive task to sort out which pipe are usable.

SUMMARY OF THE INVENTION

In a principal aspect, the present invention is a method for protecting machine or pipe threads. The thread is first cleaned and then coated with a separating agent that will prevent the thread from adhering to the protective material. Next, a mold is loosely mounted around the thread. The mold and thread bear a spaced relationship to each other and thus provide an interspece between them. Finally, the interspace is filled with a protective material such as an elastomer.

Thus, the present invention helps solve the problem of protecting devices which are to be connected with each other. The invention also protects the insides of such parts, such as pipe interiors. Such protection is most useful immediately after such devices have been manufactured. However, the method may be used independently of the manufacturing process. In addition, once the devices are to be used, the protective device can be removed with little effort and in an extremely short time. The invention hermetically seals the devices against such elements as weather, dust, sand, and salt water.

A protective material may be in the mold as it is placed around the threads or it may be injected into the interspace after the mold has already been attached to the pipe. The protective material may have elastomeric properties. Polyurethane is particularly useful with the present invention.

By using a casted cap, the threads and sealing flanges are properly sealed; rain water, snow, ice, dust, and particularly salt water and humid air cannot penetrate the cap and cause corrosion. Thus, the time consuming task of cleaning and greasing the pipe ends so that they may be connected is eliminated. Moreover, the physical strength of the cap, particularly if the mold is left on with the casting protective material, provides protection against damage from impact.

The protective device can be made simply. Moreover, it may be quickly detached from the protected objects. This feature is particularly advantageous if it is undesirable to spend time unscrewing a protective cap in the conventional manner.

For instance, the protective caps used on pipes in earth drilling projects must be removed very fast. Labor costs in such projects are high and the unscrewing of conventional protective caps for a large number of pipes causes considerable expense. In order to avoid these disadvantages, the present invention allows quick separation of the protective cap from the pipe.

The method as the additional advantage that it may be used everywhere; it is not limited to use at the factory that manufactures the pipe.

The protective cap may be made in a separate mold or be put onto the threads directly by extruding.

It is thus the object of the present invention to produce a covering that may be removed with litle effort and within a very short time. In yet another primary aspect of the present invention, a stopper is made of elastic material and can be pressed into the pipe. The outside of the stopper bears against the inside suface of the pipe, hermetically sealing it.

A stopper can also be made by pressing it directly into the pipe end. In one form of the present invention which protects inside threads, the stopper is disk-shaped and includes a projection which surrounds the periphery of the stopper. The stopper is preferably somewhat conical in shape, pointing inward toward the rest of the pipe. In addition, a wide end of the stopper pointing out of the pipe can be provided with a conical projection which surrounds the entire periphery of the pipe.

It is an object of the present invention to provide a hermetical sealing against the interiors of pipes and of other cylindrical housings. The sealing lips on the preferred form of the closing stopper are usable with pipes having different inside diameters. Thus, the production of such stoppers may be limited to a few sizes, each size having the ability to protect many different size diameter pipes. The outer edge of the stopper provides sufficient sealing for the front side of the pipe.

The disk-like stopper, which protects the insides of pipes and other such devices, has a shoulder which extends beyond the end of a protector sleeve made of steel. The conical narrowing of this shoulder facilitates the mounting of the stopper inside the pipe. The conical widening provided on the disk-shaped stopper assures that the stopper will properly seal the inside of the pipe.

The stoppers can be mouned easily because they can be pushed in by hand into the end of a pipe or into the sleeve of a protective device. As a result, the stoppers are protected against displacement. Unlike conventional protectors, this keeps the present stoppers from being lost while the pipes are being transported over great distances. Yet another object of the present invention is to provide a simple, yet highly reliable, system for sealing the interiors of cylindrical pipes or housings.

BRIEF DESCRIPTION OF THE DRAWING

A preferred embodiment of the present invention is described herein with reference to the drawing wherein.

DETAILED DESCRIPTION OF THE PREFERRED EMBODIMENT

In order to protect the inside threads on pipe ends, one may alternatively use a steel sleeve 80. The steel sleeve 80 presses an elastomeric material 81 into the individual thread turns (FIG. 1).

Figure 1:
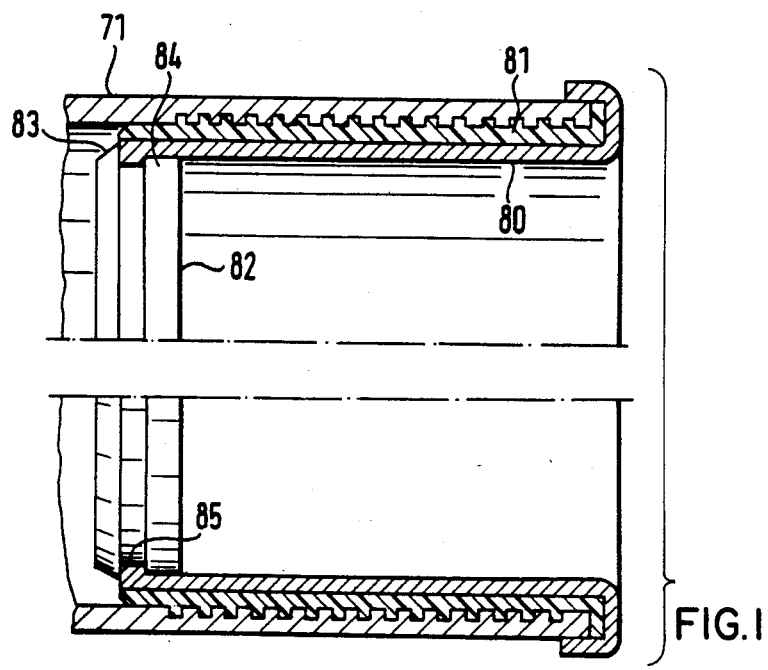
FIG. 1 is a cross-sectional view of a pipe end having an inside thread, a device for protecting threads screwed on, and a closing stopper inserted.
Figure 2:
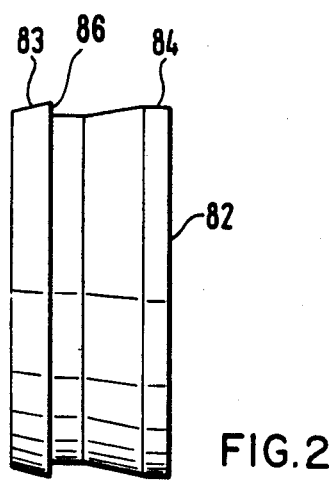
FIG. 2 is a side view of an individual stopper.

The inner, open end of the steel sleeve 80 is closed by a disk-shaped stopper 82 (FIGS. 1 and 2). The end of the stopper that would normally point inward toward the pipe includes a projection 83 that narrows conically in the direction of the pipe. The end of the closing stopper that points outward, away from the pipe, is also made with a conical projection 84 that is capable of yielding when the closing stopper is pressed into the sleeve 80. Thus, the entire inside cross-sectional area of the sleeve is sealed.

The projection 83 points inward and attaches onto the end of the sleeve 80, behind the innermost edge. As shown in FIGS. 1 and 2, the projection or flange 83 includes a conically slanting outer surface and a shoulder 86. The conically slanting outer surface slants inward, and the innermost shoulder 86 is adjacent the collar of the steel sleeve 80. Thus, it keeps the closing stopper from being pulled out.

In the lower half of FIG. 22, the sleeve 80 is shown with a collar 85 that reaches radially inward into the interspace between the projections 83, 84. Thus, the sealing effect is enhanced. The conical slanting of the projections facilitates pressing the stopper into the steel sleeve of the protective device. By means of these simple embodiments, the pipes can be exposed to weather for a long period without the danger of a corrosion of either the threads or interiors of the pipes.

What is claimed is:

1. A guard for projecting threads on the interior of an end of a pipe comprising, in combination:
   a cylindrical steel sleeve having both an outer collar over said pipe and an open inner end, said sleeve including a collar at said open inner end and said collar extending radially inward;
   a cylindrical elastomeric material between said pipe threads and said steel sleeve, said elastomeric material being pressed into said threads of the pipe and retain by said steel sleeve; and
   disk-shaped stopper means for blocking said open end of said sleeve, said stopper means including two radially extending spaced annular flanges,
   said flanges defining an interspace therebetween, said collar of said steel sleeve reaching into said interspace, each of said flanges defining substantially similar outside diameters, and
   each of the flanges including a conically slanting outer surface and a shoulder, said conically slanting outer surfaces slanting inward and the innermost shoulder adjacent said collar of said steel sleeve, whereby said shoulder resists outward pulling of said stopper means.

* * * * *